Patented June 25, 1946

2,402,667

UNITED STATES PATENT OFFICE 2,402,667

RECOVERY OF PURE BETA-PICOLINE

George Riethof, Mount Lebanon, Pa., assignor to Pittsburgh Coke & Chemical Company, a corporation of Pennsylvania No Drawing. Application May 12, 1943, Serial No. 486,742

7 Claims. (Cl. 260—290)

This invention relates to the recovery of pure beta-picoline; and it is particularly concerned with a method of recovering beta-picoline substantially free from gamma-picoline and other basic oils, from mixtures of basic oils containing beta- and gamma-picoline, said process comprising reacting said mixture of basic oils with a cyclic aldehyde in the presence of ketene until the basic oils other than beta-picoline have condensed with said aldehyde leaving the beta-picoline unchanged, and separating said condensation products from the uncombined beta-picoline; and it further comprises a process wherein the basic oil mixture is preliminarily treated to effect removal of 2,6-lutidine by reacting the 2,6-lutidine with urea and separating the reaction product from the basic oil mixture whereby substantial economy of aldehyde and ketene may be effected in the subsequent recovery of beta-picoline; all as more fully hereinafter set forth and as claimed.

One of the principal natural sources of beta-picoline is the basic coal tar oils in which it occurs in admixture with its isomers, alpha- and gamma-picoline, and its homologues, the lutidines. These basic oils can be fractionated to produce cuts rich in beta-picoline, but it is not practicable by simple distillation to separate beta-picoline from gamma-picoline and from 2,6-lutidine because all three of these basic oils boil at about 142° C. The product sold commercially as technical beta-picoline often contains fifty per cent or more of other basic oils, being perhaps seventy per cent beta- and gamma-picoline and the remainder mainly 2,6-lutidine.

Pure beta-picoline is not available commercially although beta-picoline of sufficient purity to produce, on oxidation, nicotinic acid having a melting point of about 232° C. is in demand for the production of nicotinic acid and nicotinic acid compounds for fortifying the vitamin content of foods. The specification of the melting point of the nicotinic acid formed on oxidation of beta-picoline is a valuable and accurate measure of the quality of beta-picoline, because it has been found that gamma-picoline, when present even in very small amounts in the beta-picoline, will depress the melting point of the oxidation product to 215° C., or less. Thus, by selection of beta-picoline, which on oxidation yields nicotinic acid having a melting point of 232° C. or higher, a material of high purity, and particularly a material substantially completely free of gamma-picoline, is assured.

It is an object achieved by the present invention to provide an improved process whereby beta-picoline of such purity that on oxidation it will produce nicotinic acid having a melting point above about 232° C. and as high as 235° to 237° C. may be recovered from mixtures of beta-picoline with other basic coal tar oils, particularly gamma-picoline and 2,6-lutidine in which substantial economy of operation is obtained. By the term "pure beta-picoline," as used herein and in the appended claims, I mean beta-picoline which on oxidation yields nicotinic acid having a melting point of at least 232° C. The method which I have used for the oxidation of beta-picoline to nicotinic acid is that described by Pinner in Berichte, vol. 33, page 1226 (1900), with the exception that the nicotinic acid is not purified but is tested in the form in which it crystallizes from the aqueous solution.

In my copending application Serial No. 442,725, filed May 12, 1942, I have described and claimed a process of producing pure beta-picoline from mixtures of basic coal tar oils in which the mixture of basic coal tar oils is reacted with a cyclic aldehyde in the presence of acetic anhydride. I have now found that by substituting ketene a compound having the formula $$CH_2=C=O$$

in the process described in my said copending application, substantial economies of operation may be effected. Ketene is a particularly active dehydrating agent which produces rapid reaction between the basic coal tar oils and cyclic aldehydes. Furthermore, it has a low molecular weight and a relatively small amount of it is sufficient to provide the molecular proportions required for the reaction. Thus by its use substantial economies of both time and materials are effected in the operation of the process.

The reaction between a picoline in which the methyl group is in the alpha or gamma position with a cyclic aldehyde in the presence of a dehydrating agent normally does not proceed to completion but reaches equilibrium at a point at which a relatively large percentage of the picoline remains unreacted or uncombined. I have discovered, however, that when this reaction is carried out in the presence of a tertiary amine which does not react with aldehydes and with ketenes as a dehydrating agent, the amine acts to catalyze the reaction so that it proceeds to completion and all or substantially all of the alpha- or gamma-picoline present is converted to an aldehyde condensation product. By application of this discovery to the treatment of basic coal tar oils, I have found that pure beta-picoline can be recovered from such oils containing beta-picoline in admixture with alpha- or gamma-picoline or both and with 2,6-lutidine.

I have found that on reacting a mixture of basic coal tar oils containing beta-picoline, particularly a mixture of beta-picoline with gamma-picoline or 2,6-lutidine, or both, with a cyclic aldehyde such as benzaldehyde or furfural in the presence of ketene, the beta-picoline, a tertiary amine which does not react with aldehydes, acts as a catalyst, and a reaction can be effected between the aldehyde and all of the gamma-picoline as well as with substantially all of the 2,6-lutidine to form compounds such as stilbazoles or styryl pyridines or corresponding furyl compounds, while the beta-picoline remains unchanged. The beta-picoline is readily separable from these reaction products by distillation or by extraction of the reaction mass with water. By this process, substantially complete separation of the beta-picoline from gamma-picoline and 2,6-lutidine can be effected and the beta-picoline recovered is of sufficiently high purity to produce, on oxidation, nicotinic acid having a melting point above about 232° C., usually between about 235° and 237° C. The weight of ketene required in carrying out this process is relatively low and being an active dehydrating agent the process proceeds relatively rapidly and produces at least equivalent results to those obtained with other dehydrating agents with substantial economies of operation.

In carrying out the process of my invention when beta-picoline is to be recovered from a mixture of basic tar oils containing relatively large amounts of 2,6-lutidine, it is often desirable to effect a preliminary separation of 2,6-lutidine. While my process is effective to recover pure beta-picoline from admixture with 2,6-lutidine, it is sometimes more economical to effect a preliminary separation of some of the 2,6-lutidine. Also, a pure beta-picoline can be recovered in somewhat better yield by my process from a mixture containing a relatively small amount of 2,6-lutidine than from one containing a relatively large amount.

Such preliminary separation of 2,6-lutidine can be effected by the process of my U. S. Patent 2,295,606. The method therein described comprises treating a mixture of basic tar oils containing 2,6-lutidine with urea. The urea reacts with the 2,6-lutidine to form a crystalline compound which separates out of the solution. A mixture of beta- and gamma-picoline thus separated from 2,6-lutidine may advantageously be treated according to the present invention for the recovery of pure beta-picoline.

The process of my invention is usually carried out by mixing the crude basic oil mixture containing the beta-picoline to be recovered, with an amount of ketene and cyclic aldehyde, each equal to or slightly greater than the theoretical amount required to combine with all of the gamma-picoline and 2,6-lutidine present in the crude basic oil mixture. The aldehydes which I have found most advantageous for my process are furfural and benzaldehyde. The ketene is advantageously added to the mixture of basic oils and the aldehyde gradually and with good stirring. If the reaction becomes too vigorous cooling may be applied. In the later stages heat may be applied to effect completion of the reaction.

As the reaction proceeds a black oil is formed containing unchanged beta-picoline, the reaction products and excess reagents. Upon fractional distillation of this oil, beta-picoline mixed with acetic acid can be separated. This mixture is treated with sulfuric acid to convert the beta-picoline to its acid sulfate and the acetic acid is distilled off. The remaining beta-picoline acid sulfate, upon neutralization, for example with caustic soda and re-distillation and drying yields a pure beta-picoline completely free of gamma-picoline and free or substantially free of 2,6-lutidine. The pure beta-picoline thus recovered upon oxidation yields nicotinic acid having a melting point above about 232° C., usually between 235° and 237° C.

The following examples illustrate the results obtainable by the methods of my invention:

*Example 1.*—In this example pure beta-picoline is recovered from a mixture of basic tar oils containing about 40 per cent by weight of beta-picoline, 45 per cent by weight of gamma-picoline and 15 per cent by weight of 2,6-lutidine. This basic oil mixture is obtained by treating a crude commercial picoline cut with urea according to the process of my U. S. Patent 2,295,606 to effect a preliminary separation of a part of the 2,6-lutidine.

To a mixture of 300 parts by weight of the picoline cut and 405 parts by weight of benzaldehyde there are added gradually with stirring 120 parts by weight of ketene. The reaction proceeded without heating until the later stages when a small amount of heat is applied to effect completion of the reaction. The reaction products are then treated with a small mount of water to effect hydrolysis of the excess ketene present. The black oil thus obtained is distilled off to 160° C. To the distillate about 90 parts of concentrated sulfuric acid are added to form beta-picoline sulfate and the mixture is distilled to separate acetic acid. The remaining solution of beta-picoline acid sulfate is neutralized with caustic soda and the pure beta-picoline is distilled off.

*Example 2.*—In this example pure beta-picoline is recovered from a crude picoline cut of basic tar oils containing about 35 per cent by weight of beta-picoline, 40 per cent by weight of gamma-picoline and 25 per cent by weight of 2,6-lutidine.

To a mixture of 1500 parts by weight of the crude picoline cut and 1230 parts by weight of furfural, 600 parts by weight of ketene are added gradually with stirring. This represents an excess of both reagents over the theoretical amount required to react with all of the gamma-picoline and 2,6-lutidine present. The reaction proceeds rapidly during the addition of ketene and heat is applied only in the later stages to effect completion of the reaction. The reaction mixture is then distilled off to 160° C. To the distillate 450 parts of concentrated sulfuric acid are added to form beta-picoline acid sulfate and the mixture is distilled to separate acetic acid. The remaining solution of beta-picoline acid sulfate is neutralized with caustic soda and the pure beta-picoline is distilled off.

While my invention has been defined herein with respect to certain specific embodiments thereof, it is to be understood that the invention is not limited to the details of such specific embodiments except as hereinafter defined in the appended claims.

What I claim is:

1. A process of recovering pure beta-picoline from basic oil mixtures containing beta- and gamma-picoline comprising reacting gamma-picoline with a cyclic aldehyde selected from the group consisting of benzaldehyde and furfural in the presence of ketene and thereafter separating unchanged beta-picoline from the reaction mixture.

2. A process of recovering pure beta-picoline from basic oil mixtures containing beta- and gamma-picoline and 2,6-lutidine comprising reacting the gamma-picoline and 2,6-lutidine with a cyclic aldehyde selected from the group consisting of benzaldehyde and furfural in the presence of ketene and thereafter separating unchanged beta-picoline from the reaction mixture.

3. A process of recovering pure beta-picoline from basic oil mixtures containing beta- and gamma-picoline and 2,6-lutidine comprising reacting the gamma-picoline and 2,6-lutidine with benzaldehyde in the presence of ketene and thereafter separating unchanged beta-picoline from the reaction mixture.

4. A process of recovering pure beta-picoline from basic oil mixtures containing beta- and gamma-picoline and 2,6-lutidine comprising reacting the gamma-picoline and 2,6-lutidine with furfural in the presence of ketene and thereafter separating unchanged beta-picoline from the reaction mixture.

5. A process of recovering pure beta-picoline from basic oil mixtures containing beta- and gamma-picoline and 2,6-lutidine comprising reacting the gamma-picoline and 2,6-lutidine with a cyclic aldehyde selected from the group consisting of benzaldehyde and furfural in the presence of ketene and thereafter distilling off unchanged beta-picoline from the reaction mixture.

6. A process of recovering pure beta-picoline from mixtures of basic oil containing beta- and gamma-picoline and 2,6-lutidine comprising reacting the 2,6-lutidine with urea and separating the crystalline compound thus formed from the remaining basic oils, combining the gamma-picoline and any remaining 2,6-lutidine with a cyclic aldehyde selected from the group consisting of benzaldehyde and furfural in the presence of ketene, and thereafter separating the unchanged beta-picoline from the reaction mixture.

7. A process of recovering pure beta-picoline from basic oil mixtures containing beta- and gamma-picoline and 2,6-lutidine comprising combining the gamma-picoline and 2,6-lutidine with furfural in the presence of ketene and thereafter distilling off unchanged beta-picoline, treating the distillate with sufficient sulfuric acid to convert the beta-picoline to its acid sulfate, distilling off acetic acid and other impurities from the solution of beta-picoline acid sulfate, neutralizing the remaining solution with alkali and distilling off and recovering pure beta-picoline.

GEORGE RIETHOF.